Dec. 21, 1948.     J. L. MOODY     2,456,980
MOTOR AND CLUTCH CONTROL MECHANISM
Original Filed July 30, 1945     4 Sheets-Sheet 1
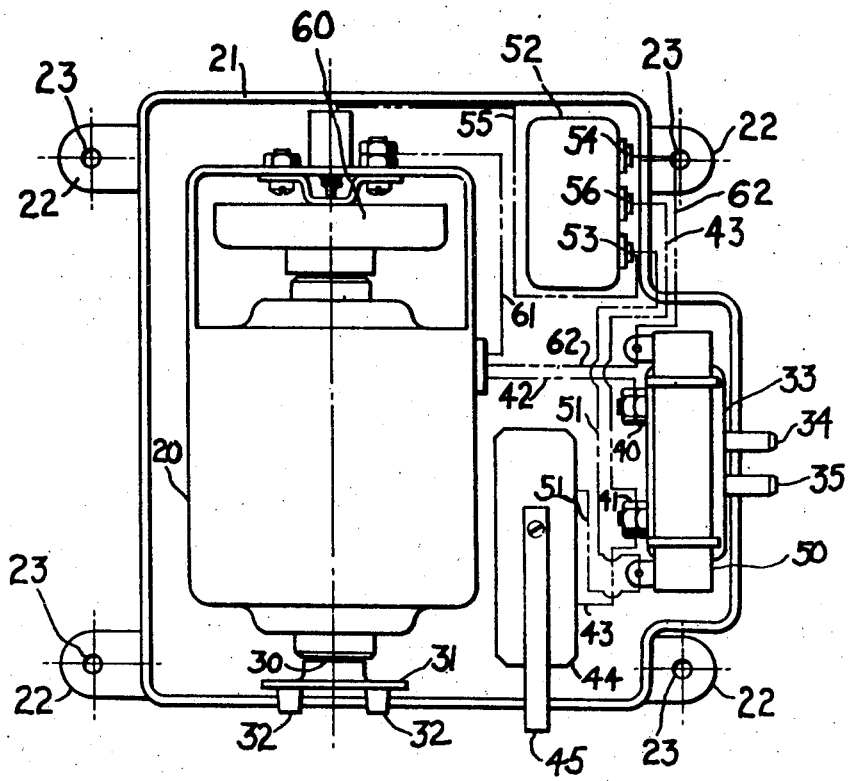
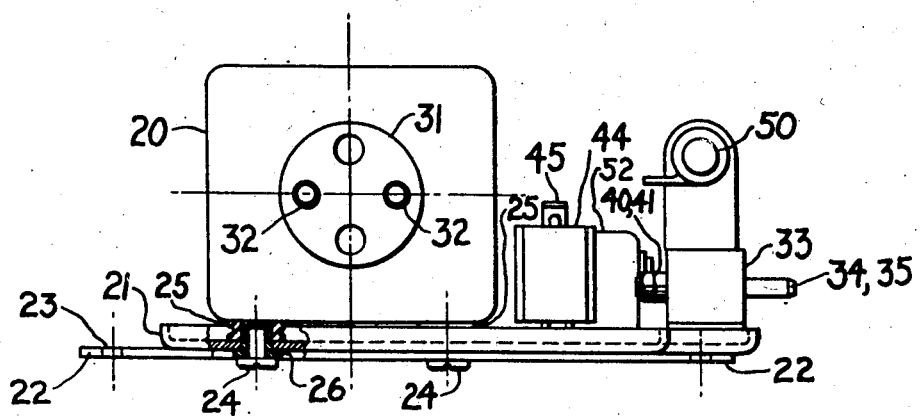
INVENTOR
JOHN L. MOODY
BY
ATTORNEY Dec. 21, 1948.                J. L. MOODY                2,456,980
                    MOTOR AND CLUTCH CONTROL MECHANISM
Original Filed July 30, 1945                        4 Sheets-Sheet 2
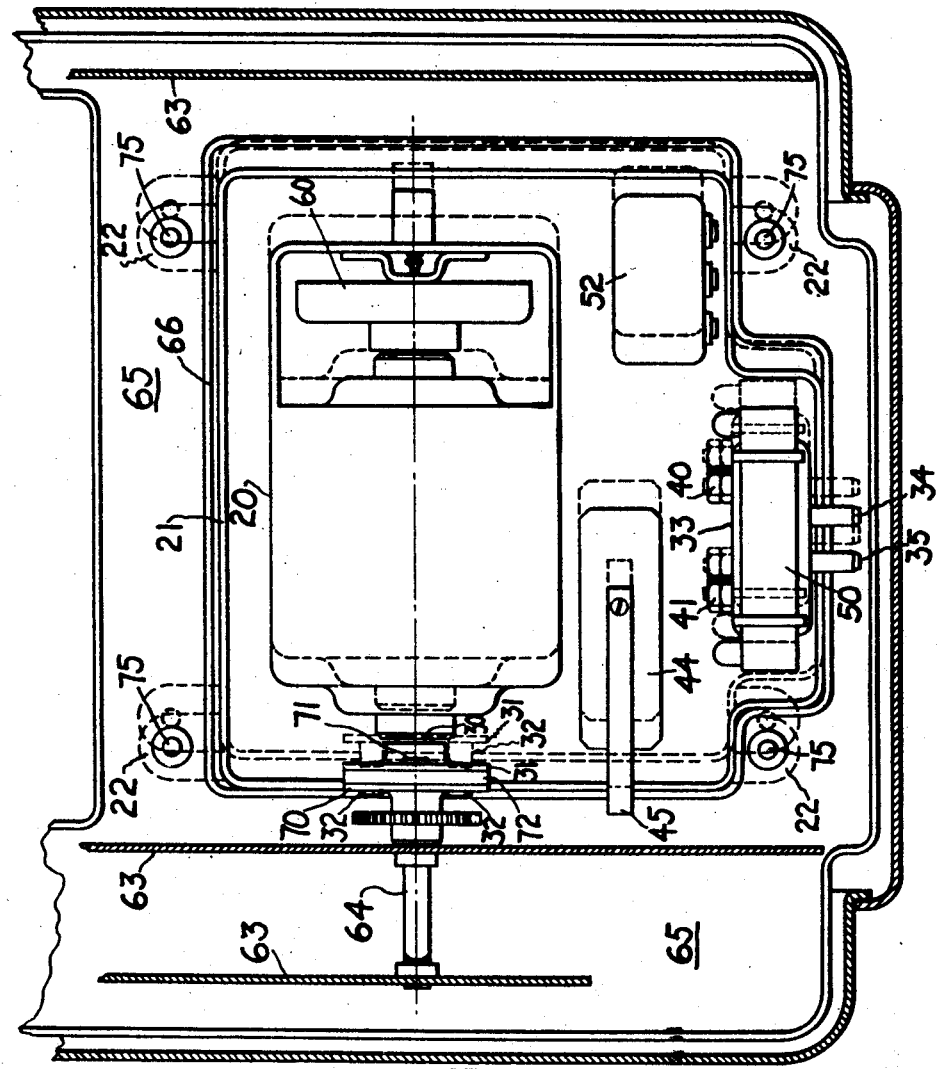
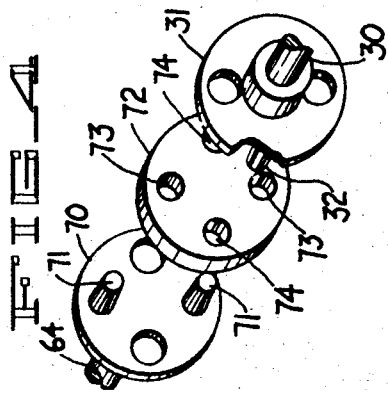
INVENTOR
JOHN L. MOODY
BY
ATTORNEY Dec. 21, 1948.                J. L. MOODY                2,456,980
                     MOTOR AND CLUTCH CONTROL MECHANISM
Original Filed July 30, 1945                          4 Sheets-Sheet 3
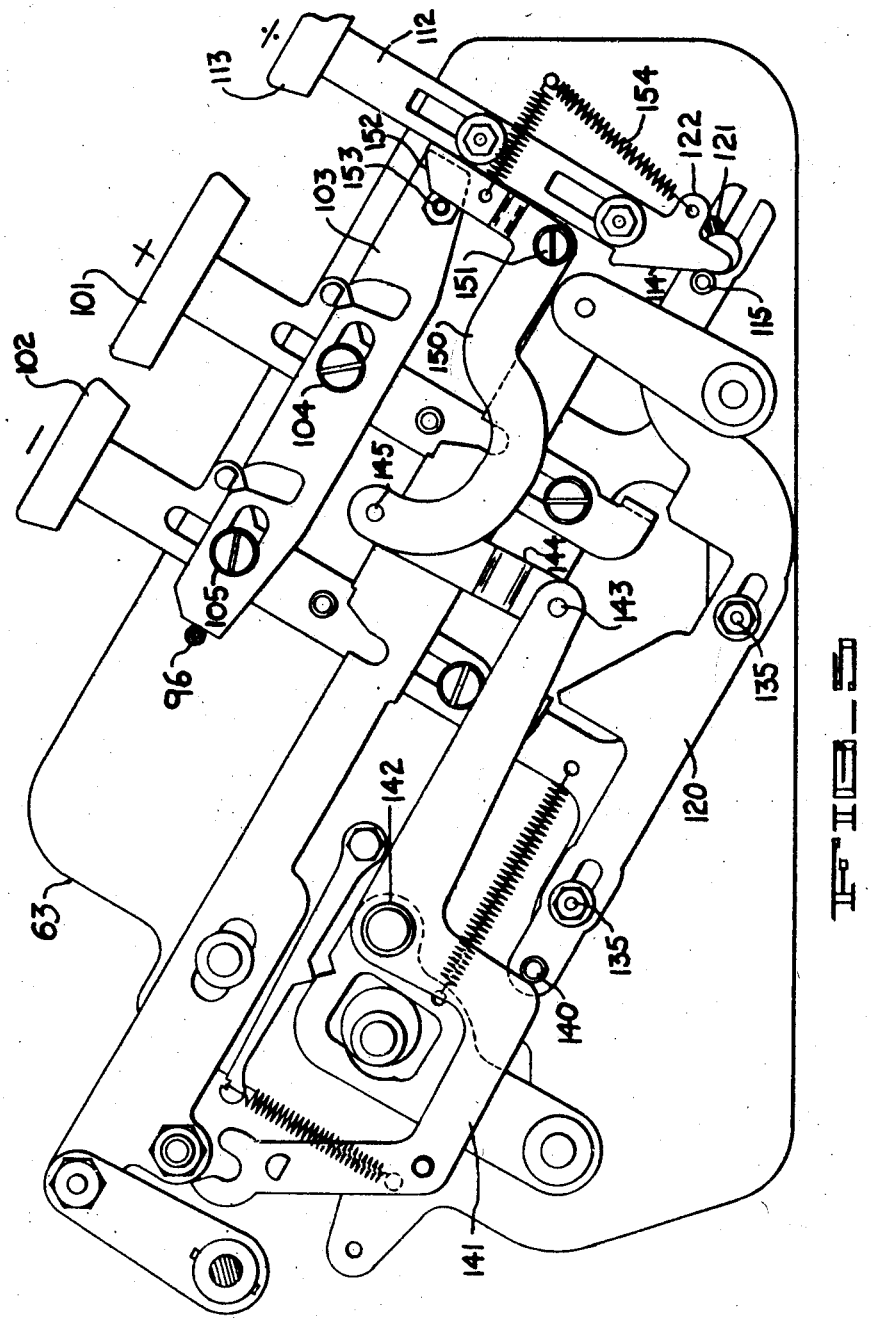
INVENTOR
JOHN L. MOODY
BY 
ATTORNEY Dec. 21, 1948.                J. L. MOODY                2,456,980
                    MOTOR AND CLUTCH CONTROL MECHANISM
Original Filed July 30, 1945                         4 Sheets-Sheet 4
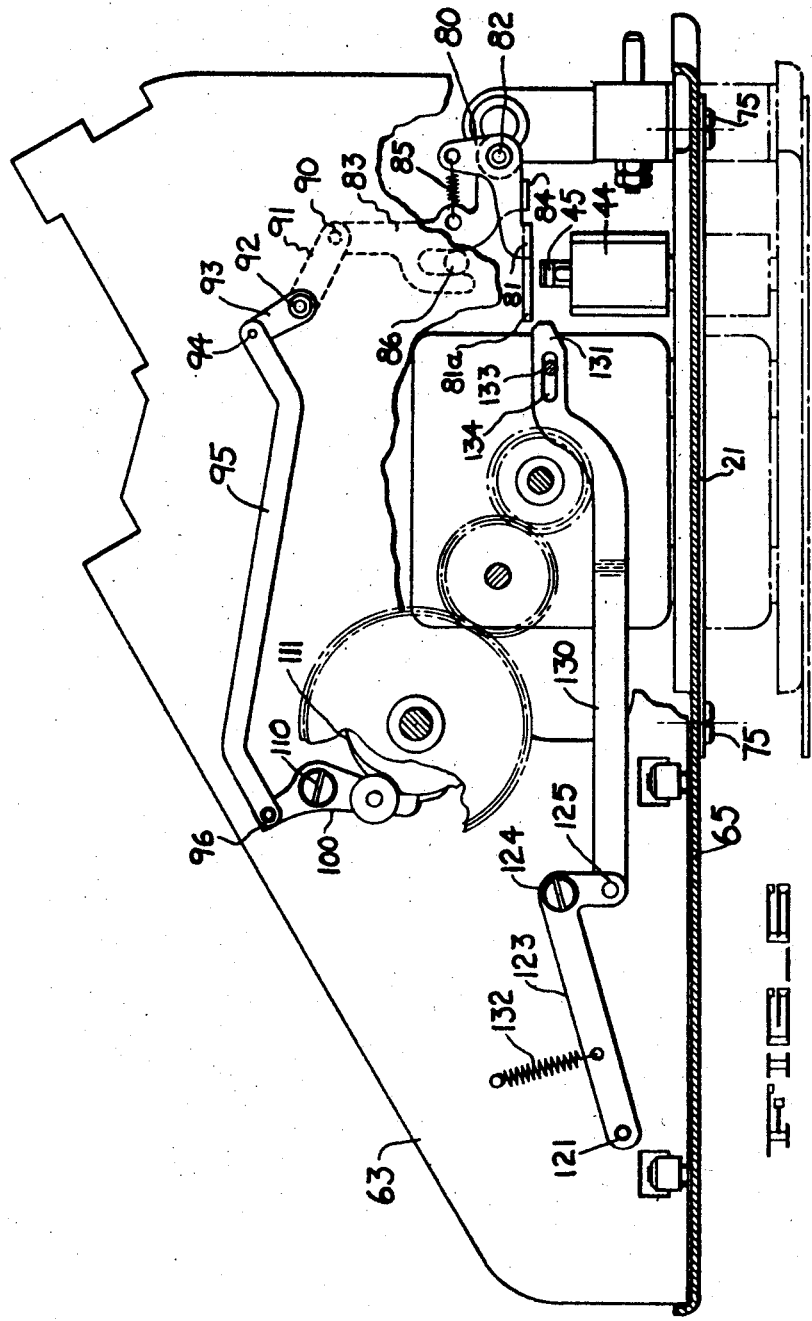
INVENTOR
JOHN L. MOODY
BY
ATTORNEY Patented Dec. 21, 1948

2,456,980

UNITED STATES PATENT OFFICE 2,456,980

MOTOR AND CLUTCH CONTROL MECHANISM

John L. Moody, Oakland, Calif., assignor to Friden Calculating Machine Co., Inc., a corporation of California Original application July 30, 1945, Serial No. 607,825. Divided and this application June 10, 1946, Serial No. 675,565

4 Claims. (Cl. 192—.02)

This invention relates to motors. More specifically, this invention relates to self-contained electrical power units and means operable for the control of same. This application is a division of application Serial No. 607,825, filed July 30, 1945.

An object of this invention is to provide an electrical power unit comprising an electric motor, a switch, a resistor, a terminal block, condensers and the necessary electrical wiring to connect these elements, thereby making said unit self-contained and sufficiently compact to be readily installed in a machine in operative driving relation therewith, or readily removed therefrom for servicing.

The following specification describes the invention as being embodied in a calculating machine similar to that disclosed in the patents to Friden Nos. 2,229,889 and 2,366,345, but this in no manner is to be construed as limiting the scope of the instant invention to the described embodiment.

In the drawings:

Figure 1 is a plan view of the self-contained electrical power unit.

Figure 2 is an elevation of the same.

Figure 3 is a plan view showing how the unit is installed in a machine.

Figure 4 is an exploded view of a coupling.

Figure 5 is an elevational section showing a part of the control mechanism of a calculating machine.

Figure 6 is an elevational section of a calculating machine showing how the unit is installed in the machine and also the means for controlling the operation of said self-contained power unit.

The electrical power unit is a self-contained driving unit wherein, unlike known electrical power drives, all elements thereof (motor, terminal block, condensers, resistor, switch, and the necessary wiring to complete a circuit) are mounted on a single, small plate that may be readily installed in a machine in operative driving relation therewith, or removed therefrom for servicing. In known calculating machines, should the motor switch become damaged, it would be necessary to disassemble the machine to a marked extent in order to repair or withdraw the switch and to install a new one in its place. In the unit of the invention, however, should any portion of the electrical circuit need repair or replacement, it would be necessary only to unscrew four mounting screws, as will be apparent from the following description, and withdraw the complete electrical unit from the machine for said repair or replacement.

Referring to Figures 1 and 2, 20 indicates an electric motor of suitable size and shape mounted on grommets 25 and secured to a frame 21 by screws 24 within insulating members 26. Secured to a rotatable shaft 30 of motor 20, is a suitable coupling 31 with pins 32 capable of transmitting rotation from said motor shaft to a driven part of the calculating machine when the power unit is installed therein as will hereinafter be more fully explained. Mounted on frame 21 is a terminal block 33 of insulating material with lead terminals 34 and 35 mounted therein. Electrically connected to lead terminals 34 and 35 are suitable lead connectors 40 and 41 respectively. Secured to the connector 40 is a lead 42 which is connected at its other end to a field coil of motor 20. (Note: Wires connecting parts of the power unit are indicated by dash-double-dot lines.) Another lead 43 connects one terminal of a normally open micro switch 44 to a terminal 56 of a dual condenser 52, and intermediate its ends it is secured to connector 41. A lead 51 connects the second terminal of micro switch 44 with a common terminal 53 of dual condenser 52, and intermediate its ends, lead 51 is connected to one terminal of a resistor 50. Also connected to the common terminal 53 of condenser 52 is a lead 55 which is connected at its other end to one terminal of a speed controlling device or governor 60. From the other terminal of governor 60, a lead 61 is connected to the other terminal of the motor 20. A lead 62 connects this common motor terminal with a second terminal 54 of the dual condenser 52, and intermediate its ends it is connected to the other terminal of resistor 50.

The foregoing description of the electrical power unit wiring is not to be construed as the only scheme of wiring for such a unit, but will serve to clarify the functions of the component parts and show that all the necessary wiring is contained within said unit. In other words, as will presently be explained, when the power unit is installed in the machine no electrical connections have to be made between the power unit and the machine.

Integral with frame 21 are a plurality of ears 22 provided with screw holes 23 to enable the frame 21 of the electrical power unit to be fastened to the base of the calculating machine.

Referring to Figure 3, 65 is the base of a calculating machine. A frame 63 secured to said base has a shaft 64 mounted therein. A coupling 70 (Fig. 4) with pins 71 is secured to shaft 64. When the unit is installed in the machine, the coupling 70 is adapted to be connected to the coupling 31 by means of an intermediate member 72 of insulating material having holes 74 to receive pins 71 and holes 73 to receive pins 32.

The base 65 of the calculating machine is provided with an aperture 66 (Fig. 3), generally similar to the outline of the base 21 of the electrical power unit, exclusive of ears 22, through which said unit may be introduced for installation in the machine. As shown in phantom lines in Figure 6, the unit is introduced from the underside of the base 65. After the couplings 31 and 70 are brought into alignment, the unit is moved laterally from the dotted line position (Fig. 3) to the full line position. When the coupling pins have been engaged in the holes of the intermediate member 72, the driving connection between the motor 20 and the drive shaft 64 in the machine is complete. The unit is then secured to the calculator base 65 by screws 75 passing through the holes 23 in the ears 22.

When the electrical power unit is thus secured to the machine, the microswitch on said unit is disposed in operative relationship with control mechanism in the machine. When the electrical power unit is so positioned in the machine, the control leaf 45 (Fig. 6) of microswitch 44 underlies or an ear 81 on bellcrank 80 pivotally mounted on arm 83 at 82. Arm 83 with a stop ear 84, formed thereon, underlying bellcrank 80 is guided by pin 86 on machine frame 63. A spring 85 urges bellcrank 80 into engagement with ear 84 of arm 83. The other extremity of arm 83 is pivotally connected at 90 to arm 91 secured to a shaft 92 which is rotatably mounted on the machine frame 63. Arm 93, also secured to shaft 92, is pivotally connected at 94 to link 95 pivotally connected to a conventional clutch control element 100, by pin 96.

The elements shown in Figure 5 are generally similar to those described in the patent to Friden No. 2,366,345, and will therefore be only briefly described in this specification insofar as they control the operation of the above-described series of levers, links, etc. Plus and minus keys 101 and 102, respectively, and division key 113, control in the conventional manner the lateral displacement of slide 103, slidably mounted on the machine frame 63 at 104 and 105. Abutting the rear end (to the left in Fig. 5) of slide 103 is a pin 96 which, as heretofore explained, interconnects clutch control element 100 with link 95. Thus it will be obvious to those skilled in the art that depression of any operation control key will cause pin 96 (Fig. 5) to be displaced rearwardly.

Viewing Figure 6, rearward displacement of pin 96 causes clutch element 100 to be rotated clockwise about its pivot 110, thereby effecting engagement of clutch 111 in an orthodox manner. Rearward displacement of pin 96 also moves link 95 rearwardly, thereby rotating arms 93 and shaft 92 in a clockwise direction. Clockwise rotation of arm 91 causes downward movement of arm 83 and lip 81 depresses leaf or switch control element 45, moving it from its normal position to its operated position, and closing the above-described electrical circuit and starting the motor.

In a calculating machine similar to that disclosed in the above-cited patents to Friden, in a division operation the driving means is not started by the depression of the division key, but by the return of said key to inoperative position. Thus a different set of conditions must govern starting the motor in division from those in other operations.

Depression of division key 113 (Fig. 5) causes its associated key stem 112 and cam surface 114 formed thereon to be displaced downwardly, moving follower 115 in contact therewith, and associated slide 120, laterally (to the left in Fig. 5), essentially as described in the above-mentioned patents to Friden. An ear 122 formed on key stem 112 abuts a pin 121 secured to pivotally mounted bellcrank 123 (Fig. 6), so that the above-mentioned downward displacement of key stem 112 also causes counter-clockwise rotation of bellcrank 123 about its pivot 124 against the urgency of spring 132. At 125 bellcrank 123 is connected to link 130, guided by slot 134 and pin 133 secured to the machine frame. The arm 130 is capable of being displaced (to the right in Fig. 6) to dispose its rear end 131 under extension 81a of ear 81. The above-mentioned counter-clockwise rotation of bellcrank 123 will cause link 130 to be displaced to the right (Fig. 6) and will project end 131 thereof under extension 81a of ear 81, thereby restraining bellcrank 80 from operating switch 44 when the division key is depressed.

Depression of division key 113 (Fig. 5) through cam 114 and follower 115 moves slide 120, which is slidably mounted on frame 63 by pins 135, to the rear, causing pin 140 to rotate crank 141 clockwise about its pivot 142. Crank 141 has pivotally connected thereto at 143 a link 144 which is connected at 145 to a bellcrank 150 pivoted at 151. Counter-clockwise rotation of bellcrank 150 causes its end 152 to move pin 153 secured in slide 103 toward the rear of the machine, thereby moving pin 96 (Fig. 6) rearwardly, which movement causes engagement of the clutch. Rearward movement of pin 96 also causes downward movement of arm 83. By the action of spring 85, bellcrank 80 is urged counterclockwise about center 82 to follow ear 81 on bellcrank 80 but is blocked or restrained from so doing by the end 131 of link 130 which is moved under extension 81a when the division key is depressed. Upon release of division key 113 (Fig. 5), said key is caused to return to inoperative position by the urgency of spring 154, allowing bellcrank 123 (Fig. 6) to rotate clockwise under the urgency of spring 132, withdrawing the end 131 of link 130 from under ear 81a of bellcrank 80 enabling said bellcrank to rotate counterclockwise under the urgency of spring 85 until restrained from further rotation by lip 84 of crank 83. The resulting counter-clockwise rotation of bellcrank 80 causes its lip 81 to contact and depress leaf 45 of microswitch 44, thereby starting the motor.

From the foregoing it will be seen that depression of any operation control key of the calculating machine will cause the clutch to be engaged in a conventional manner, and will also urge bellcrank 80 to close the microswitch 44 of the power unit. In a division operation, however, the disabling means is operated to restrain the rotation of yieldable bellcrank 80, and resultant closing of microswitch 44, until division key 113 returns to its raised position, at which time bellcrank 80 is allowed to rotate under the urgency of spring 85, thereby depressing leaf 45 of microswitch 44 to close the motor circuit.

Thus it will be seen that I have provided an electrical power unit which can be readily installed in and removed from a calculating machine, which only requires sliding a coupling into engagement to establish a driving connection between the motor and the drive shaft of the machine and which entirely eliminates the necessity of removing electrical parts individually, disconnecting wiring or mechanically connecting the switch to the calculating machine controls. In addition the power unit when installed in the machine is electrically insulated therefrom by the coupling member 72 and the mounting members 26.

I claim:

1. In an electrically-driven calculating machine, drive mechanism adapted to be driven by an electric motor, a clutch in said drive mechanism, a control for said clutch, a plurality of machine operation keys, means actuated by depression of any of said keys to operate said clutch control, a motor switch having a control element movable from a normal position to an operated position to render said switch effective, means actuated by said clutch control including a member resiliently urged to move said switch control element from its said normal position to its said operated position, and means actuated to by one of said keys to restrain said member and prevent it from moving said control element to its said operated position until release of said one key, whereby said motor switch is closed only after depression and release of said one key and is closed immediately upon depression of another of said keys.

2. In an electrically driven calculating machine, an electric motor; drive mechanism operatively related to said motor; a clutch in said drive mechanism; a control for said clutch; a plurality of machine operation keys; a motor switch having a control element movable from a normal position to an operated position to render said switch effective; connecting means interposed between said keys and said clutch control, and between said keys and said switch control element for operating said clutch control and said switch control element in response to operation of said keys, the connecting means for operating said switch control element comprising a yieldable member; and means actuated by movement of one of said keys in one direction for restraining said yieldable member against operative movement to thereby prevent operation of said switch control element until release of said one of said keys and movement thereof in the return direction.

3. In an electrically driven calculating machine, an electric motor; drive mechanism operatively related to said motor; a clutch in said drive mechanism; a control for said clutch; a plurality of machine operation keys; a motor switch having a control element movable from a normal position to an operated position to render said switch effective; connecting means interposed between said keys and said clutch control, and between said keys and said switch control element for operating said clutch control and said switch control element in response to operation of said keys, the connecting means for operating said switch control element comprising two articulated parts conjoint movement of which causes one of said parts to operate said switch control element, and a spring yieldably constraining said two parts normally to move conjointly; and means actuated by movement of one of said keys in one direction for blocking operating movement of said one of said parts and thus preventing it from operating said switch control element until release of said one of said keys and movement thereof in the opposite direction.

4. In an electrically driven calculating machine, an electric motor; drive mechanism operatively related to said motor; a clutch in said drive mechanism; a control for said clutch; a plurality of machine operation keys; a motor switch having a control element movable from a normal position to an operated position to render said switch effective; connecting means interposed between said keys and said clutch control, and between said keys and said switch control element for operating said clutch control and said switch control element in response to operation of said keys, the connecting means for operating said switch control element comprising an arm movable in response to depressing of either of said keys, a lever pivoted on said arm, a stop on said arm, and a spring for yieldably holding said lever against said stop in position to operate said switch control element upon key-responsive movement of said arm a blocking member; and means responsive to depressing of one of said keys for moving said blocking member into the path of operating movement of said lever to prevent the latter from operating said switch control element, and responsive to returning of said one of said keys for withdrawing said blocking member from said path to enable said spring to move said lever to operate said switch control element.

JOHN L. MOODY.

REFERENCES CITED

The following references are of record in the file of this patent:

UNITED STATES PATENTS

| Number | Name | Date |
|---|---|---|
| 1,935,851 | Lerch | Nov. 21, 1933 |
| 2,215,263 | Eichler | Sept. 17, 1940 |
| 2,229,889 | Friden | Jan. 28, 1941 |
| 2,346,603 | Payne | Apr. 11, 1944 |
| 2,366,345 | Machado | Jan. 2, 1945 |